(12) United States Patent
Liao

(10) Patent No.: US 7,599,122 B2
(45) Date of Patent: Oct. 6, 2009

(54) MICROSCOPE OPTICAL SYSTEM AND DIGITAL MICROSCOPE HAVING THE SAME

(75) Inventor: Chen-cheng Liao, Tantz Shiang (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 12/202,008

(22) Filed: Aug. 29, 2008

(65) Prior Publication Data

US 2009/0059386 A1 Mar. 5, 2009

(30) Foreign Application Priority Data

Aug. 31, 2007 (TW) .............................. 96132546 A

(51) Int. Cl.
*G02B 15/14* (2006.01)
(52) U.S. Cl. ...................................... 359/680; 359/686
(58) Field of Classification Search ................. 359/680, 359/681, 682, 686
See application file for complete search history.

(56) References Cited

U.S. PATENT DOCUMENTS 7,218,455 B2 * 5/2007 Iwasawa ..................... 359/680
7,342,727 B2 * 3/2008 Iwasawa ..................... 359/686

* cited by examiner

*Primary Examiner*—Scott J Sugarman

(57) ABSTRACT

A microscope optical system includes, in order from an object side to an image side, a first lens group, a second lens group, a stop, a third lens group, a fourth lens group and a sensor. The first to fourth lens groups all have at least one lens element and at least one of lens elements of the first to fourth lens groups has an aspheric surface. The microscope optical system satisfies several specific conditions so as to provide microscope images of high resolution and high zoom ratio. A digital microscope having the microscope optical system adopts a CCD sensor so that a observer may observe microscope images displayed on a large display screen and store the images for subsequent edition or inspection.

20 Claims, 13 Drawing Sheets

MICROSCOPE OPTICAL SYSTEM AND DIGITAL MICROSCOPE HAVING THE SAME

BACKGROUND OF THE INVENTION

1. Field of the Invention

The present invention relates to a microscope optical system, and more particularly to a microscope optical system having a sensor for acquiring a digital microscope image that need not be observed through an ocular lens. The present invention is also related to a digital microscope having the microscope optical system.

2. Description of the Prior Art

The most widely used microscope is a compound microscope having at least two lenses, an objective lens and an ocular lens, respectively mounted at two opposite ends of a closed tube to provide a greater magnification. The observer observing through the ocular lens sees an enlarged virtual image of the real image. The virtual image display method for projecting the virtual image through the ocular lens directly onto the retina of the observer's eyes generally makes the observer feel tired (namely, visual fatigue) because the exit pupil diameter of the ocular lens is very small and the movement sideways of the body of observer probably causes a little endless movements of the observer's eyes.

Recently, one conventional microscope employs a special connection device for coupling the microscope with a digital camera. Though the observer does not need to directly observe through the ocular lens of the microscope coupled with a digital camera, it is very inconvenient to carry the microscope loaded with the digital camera and the special connection device and to view the small display of the digital camera.

On the other hand, the conventional microscope has a fixed focal length and multiple objective lenses. When the observer wants to see the virtual images having different magnifications, the objective lens must be changed. For example, the observer must try to change the objective lens one by one from all the objective lenses when observing a different object.

Hence, it is needed to provide a digital microscope and a microscope optical system for resolving the shortcomings of conventional designs and devices.

SUMMARY OF THE INVENTION

Accordingly, an objective of the present invention is to provide a microscope optical system featuring high resolution and high zoom ratio.

It is another objective of the present invention to provide a microscope optic system that comprises an image sensor for converting optic signals into digital signals for improving stability, observability and storability of microscope images in digital forms.

To achieve the above objectives of the present invention, a microscope optical system in accordance with the present invention comprises, in order from an object side to an image side, a first lens group, a second lens group, a stop, a third lens group, a fourth lens group and a sensor. The first to fourth lens groups all have at least one lens element and at least one of said lens elements of the first to fourth lens groups has an aspheric surface. During zooming of the optic system from a wide-angle end to a telephoto end, the first and fourth lens groups are kept stationary, while the second and third lens groups are movable.

The microscope optical system satisfies the following condition:

$$0.5 < \frac{F1}{F2} < 1.0$$

where F1 represents the combined focus (or overall focus) of the first lens group and F2 represents the combined focus of the second lens group.

The microscope optical system further satisfies the following condition:

$$\left|\frac{F2}{F3}\right| < 0.1$$

where F2, as mentioned above, is the combined focus of the second lens group, while F3 represent the combined focus of the third lens group.

Further, to achieve the above objectives of the present invention, the present invention provides a digital microscope adopting the above microscope optical system.

In comparison with the prior art, the microscope optical system according to the present invention can zoom and focus by only moving the second and third lens groups and this simplifies the overall construction of the optic system. The microscope optical system of the present invention, satisfying several specific conditions, can effectively eliminate aberrations and features high resolution and high zoom ratio. The microscope optical system has a zoom ratio as high as about ten so that a user can randomly choose any desired zoom ratios as required without change of objective lens. Moreover, because the microscope optical system includes a CCD sensor, an observer may observe microscope images displayed on a large display screen and store the image for subsequent edition or inspection. Thus, the stability, observability and storability of the microscope image can be improved.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1A:
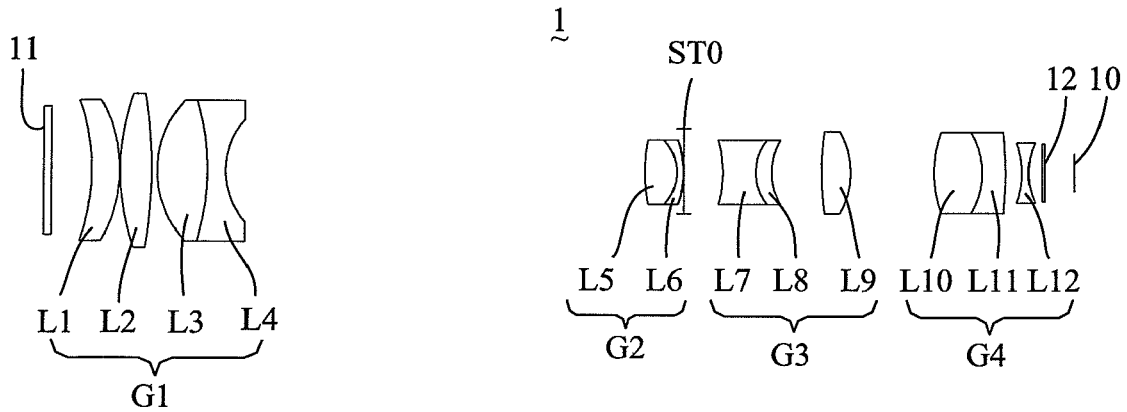
FIGS. 1A-1C respectively show lens arrangements of a microscope optical system according to the present invention at a wide-angle end, an intermediate zoom position and a telephoto end.
Figure 1B:
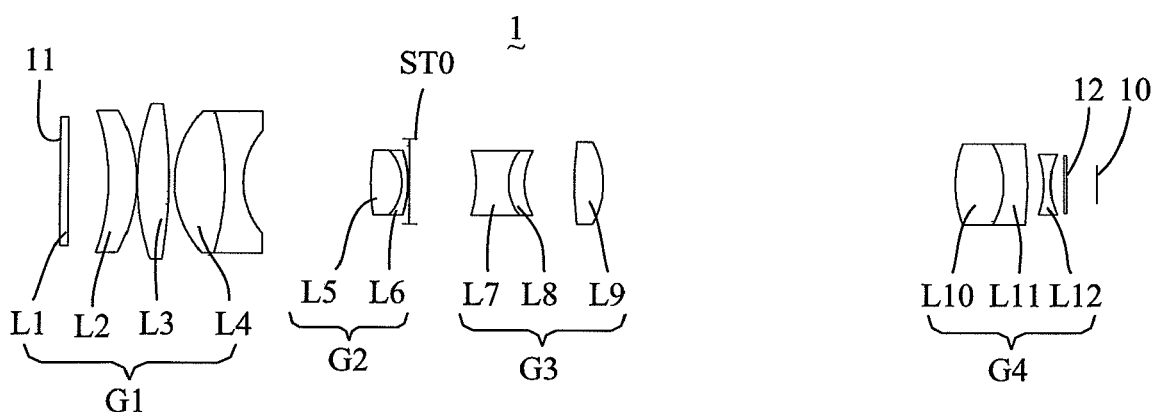
Figure 1C:
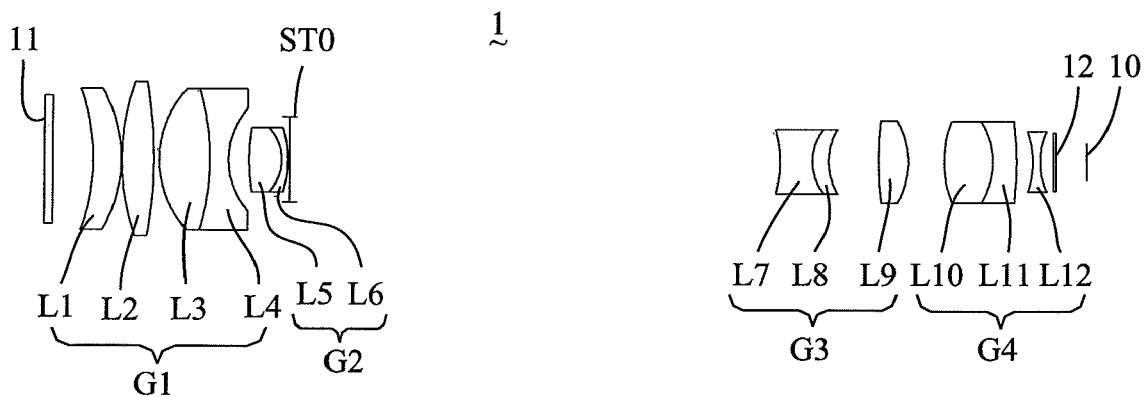
Figure 2A:
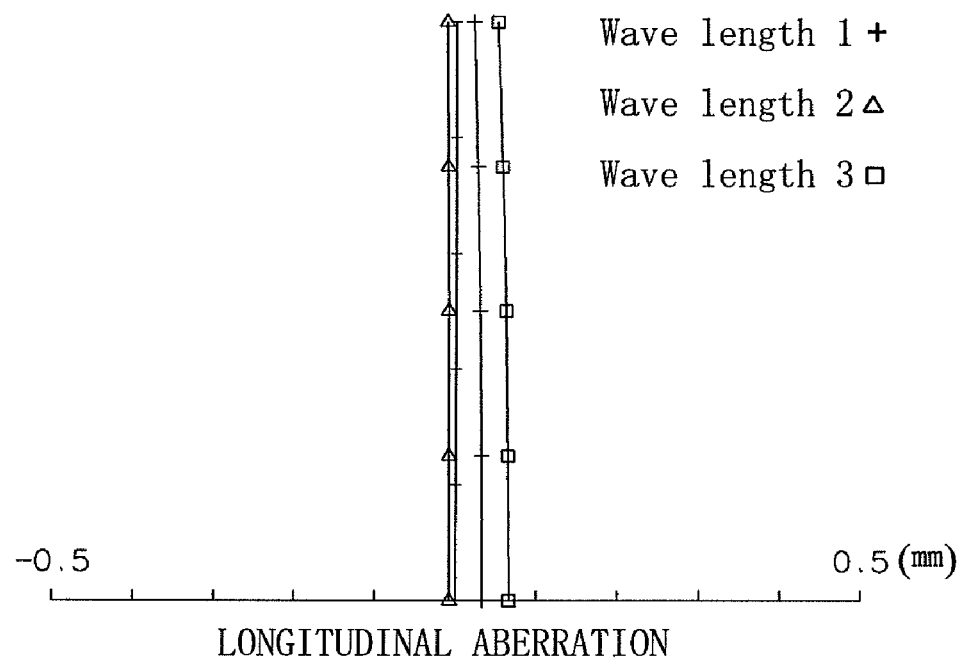
FIGS. 2A-2D respectively show longitudinal spherical aberration, field sags, distortion aberration and lateral chromatic aberration of Numerical Embodiment 1 of the present microscope optical system at the wide-angle end.
Figure 2B:
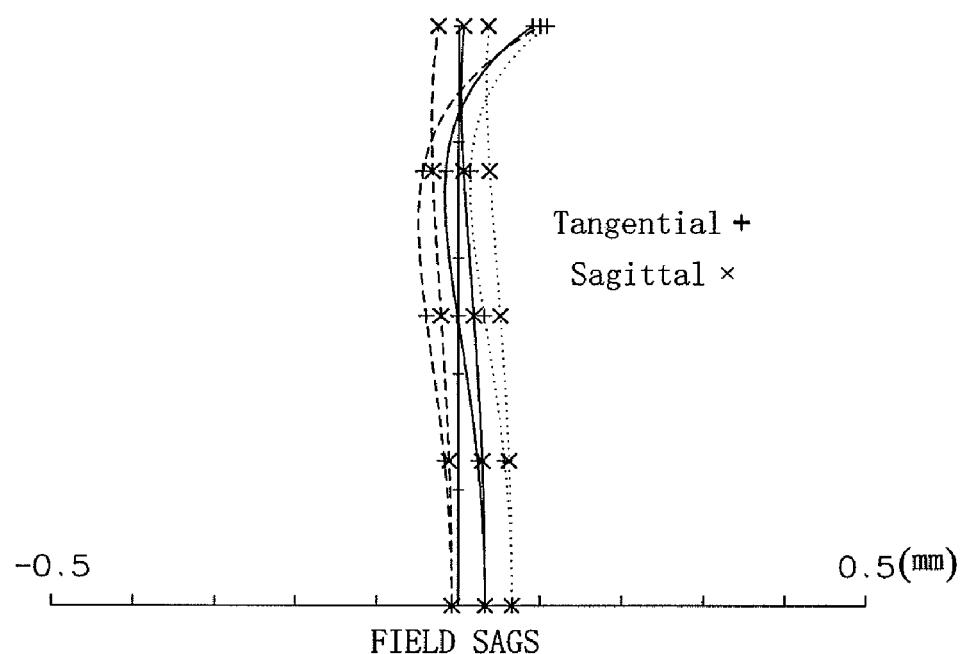
Figure 2C:
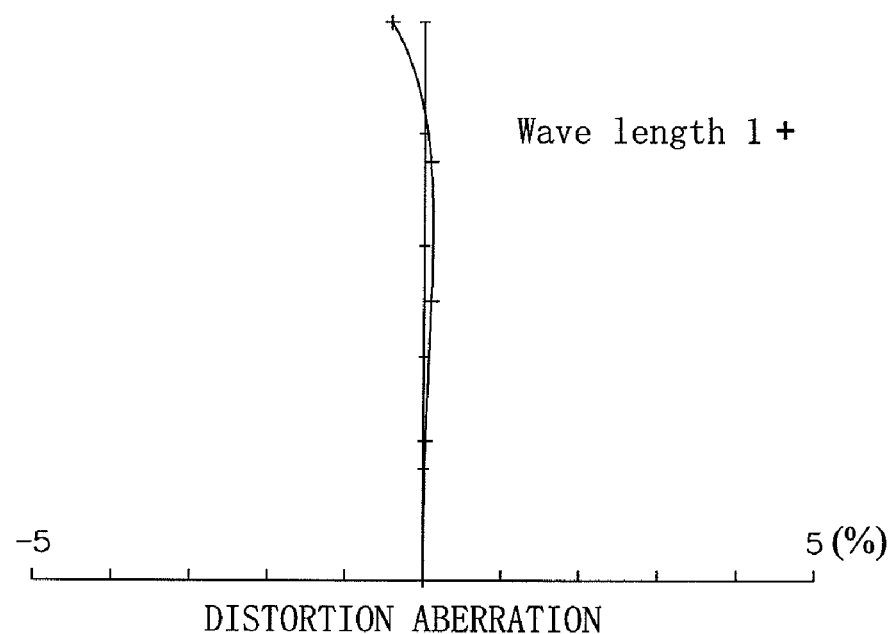
Figure 2D:
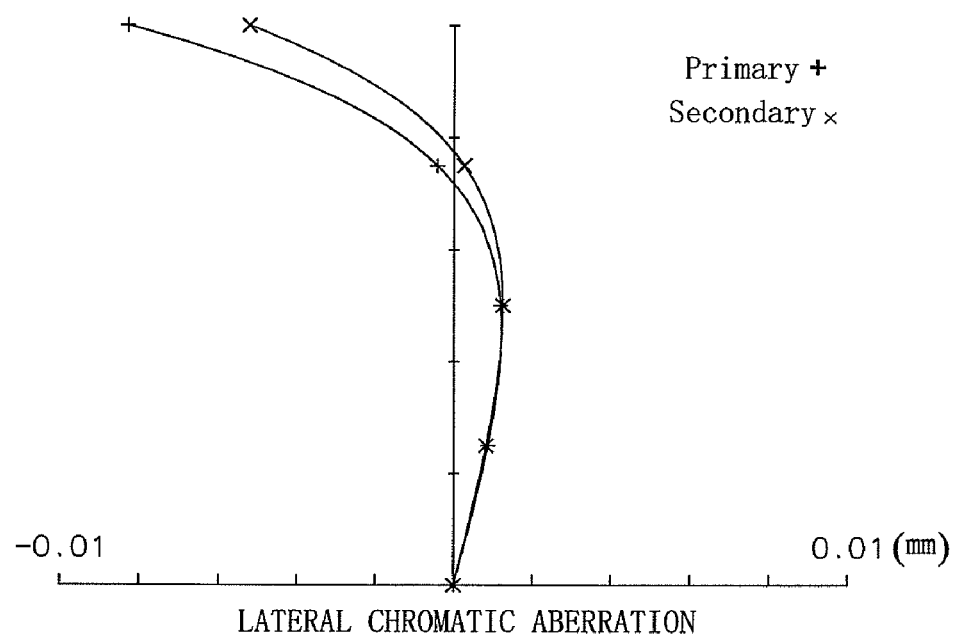
Figure 3A:
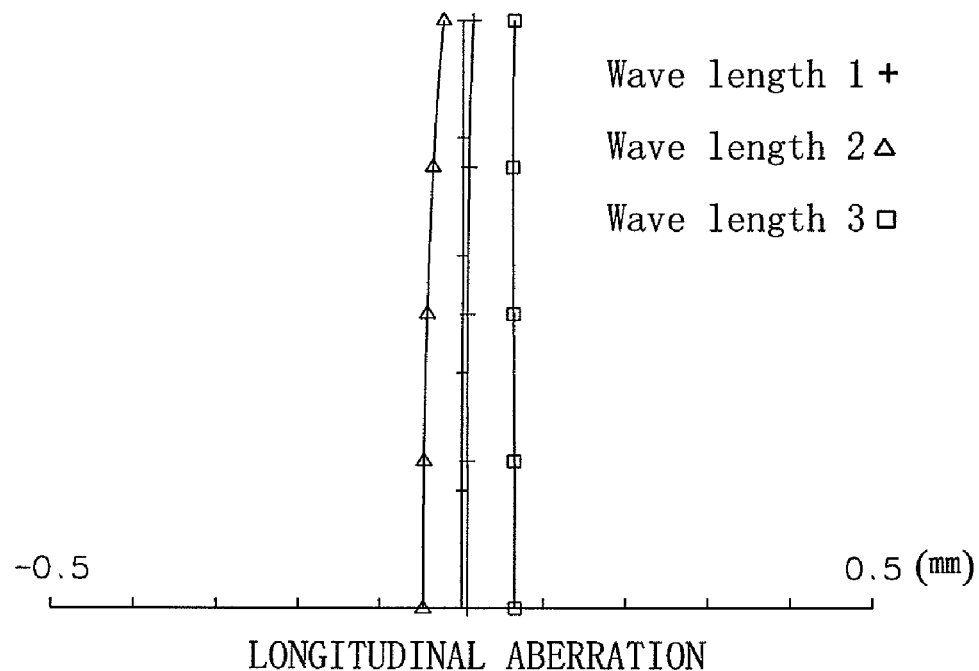
FIGS. 3A-3D respectively show longitudinal spherical aberration, field sags, distortion aberration and lateral chromatic aberration of Numerical Embodiment 1 of the present microscope optical system at the intermediate zoom position.
Figure 3B:
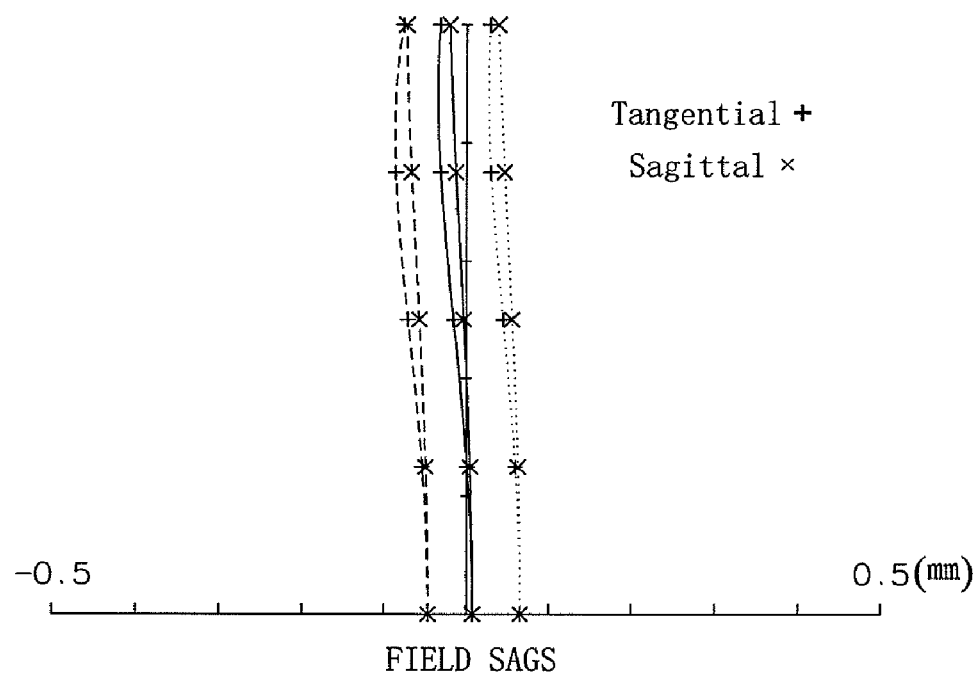
Figure 3C:
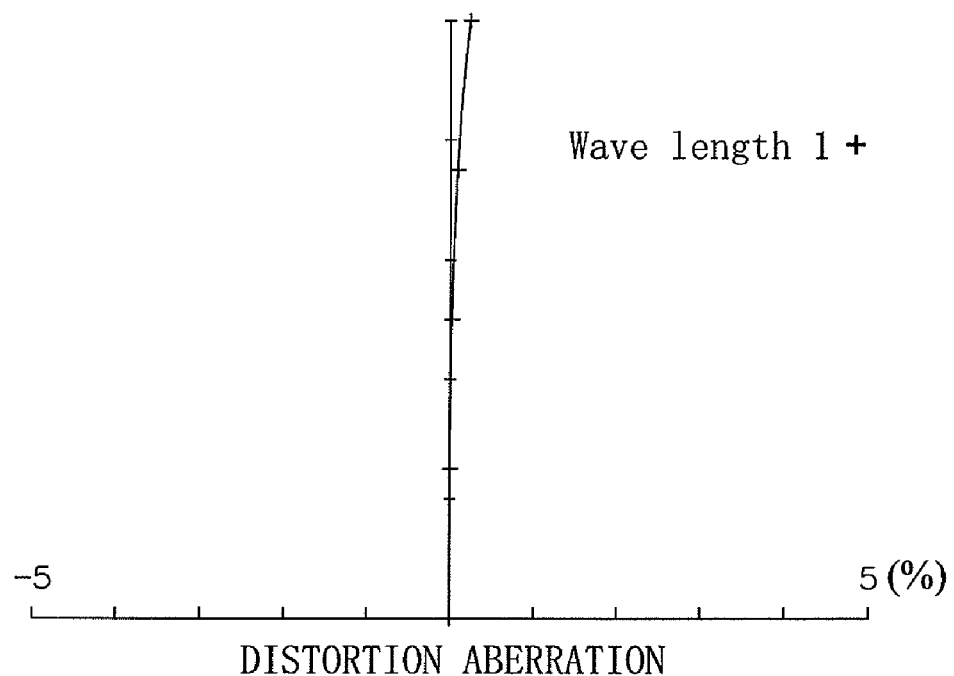
Figure 3D:
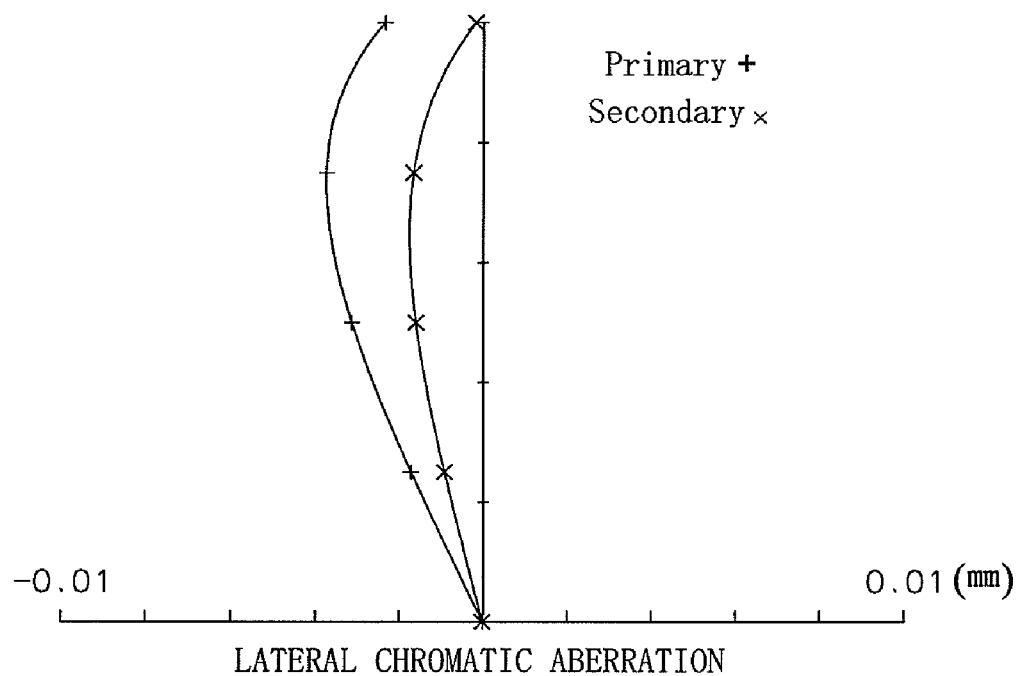
Figure 4A:
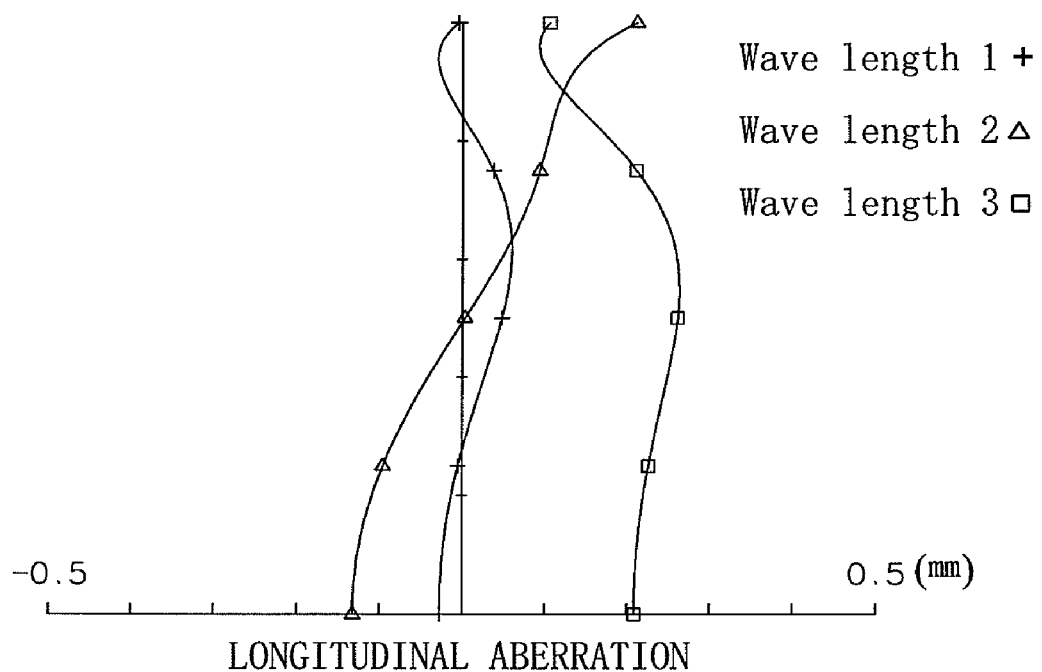
FIGS. 4A-4D respectively show longitudinal spherical aberration, field sags, distortion aberration and lateral chromatic aberration of Numerical Embodiment 1 of the present microscope optical system at the telephoto end.
Figure 4B:
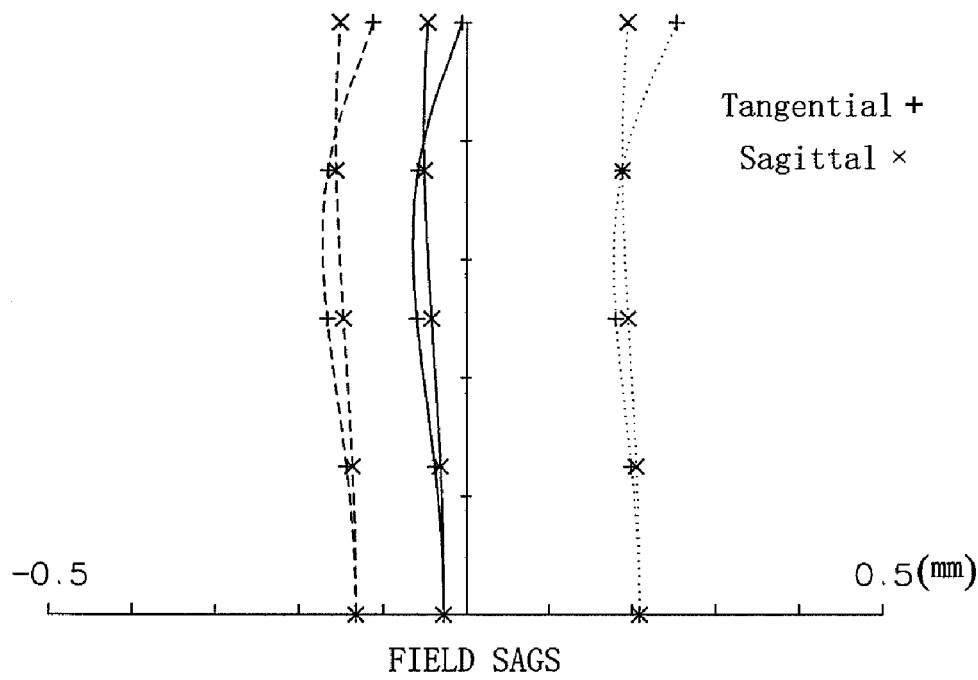
Figure 4C:
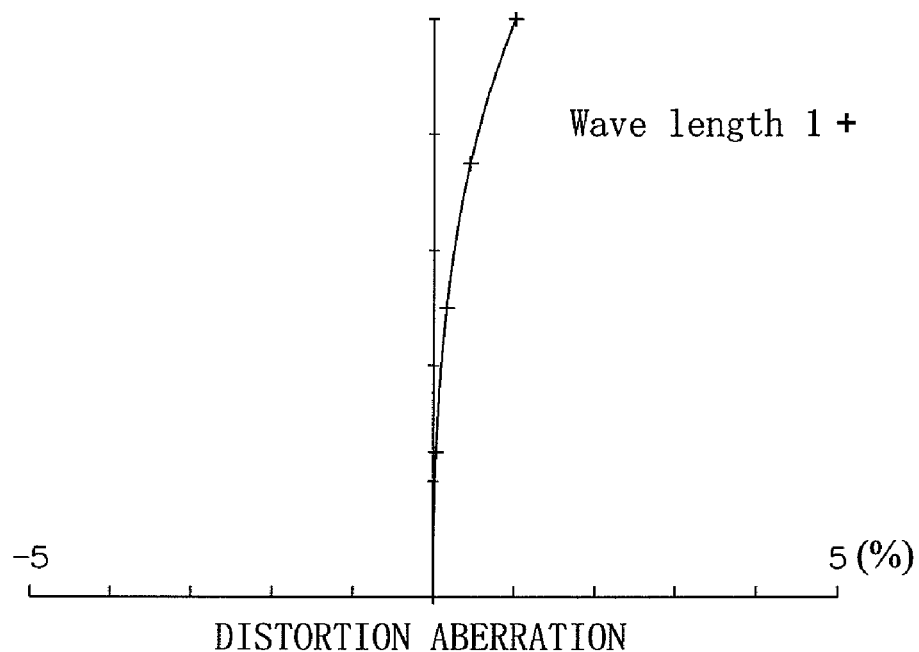
Figure 4D:
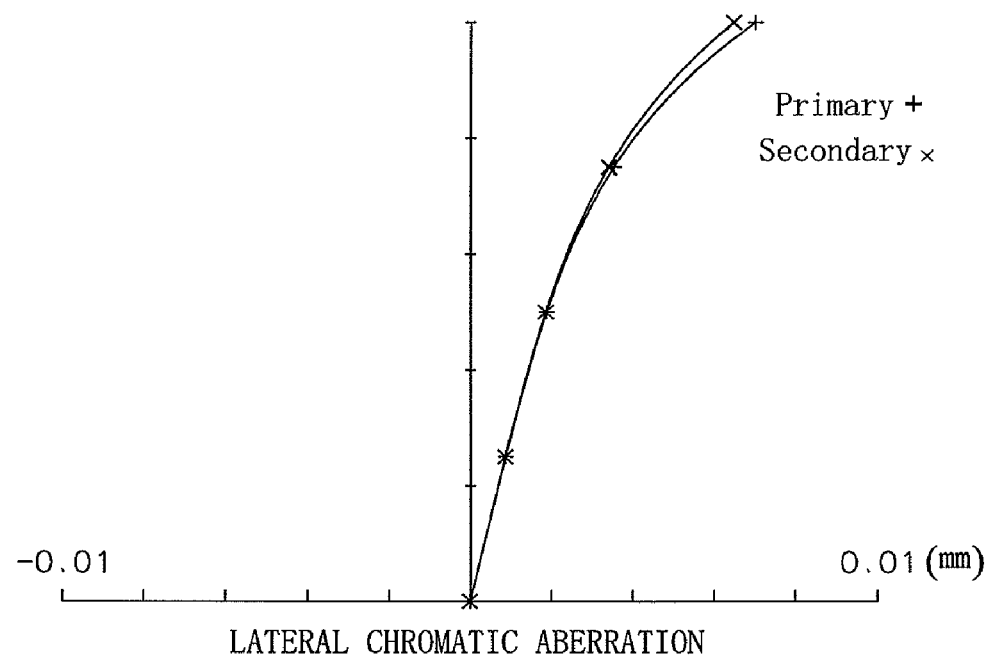
Figure 5A:
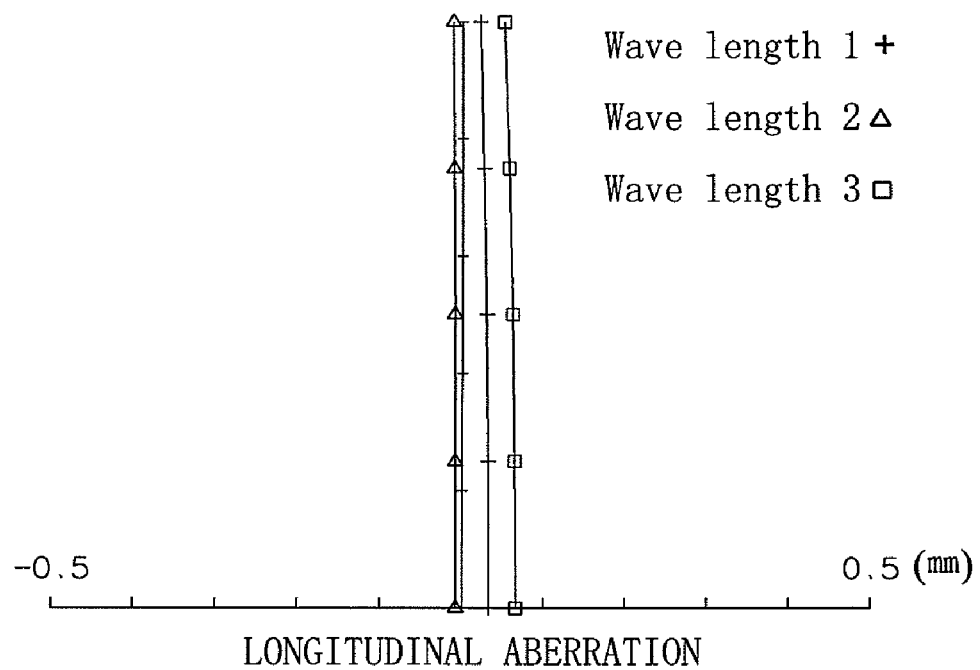
FIGS. 5A-5D respectively show longitudinal spherical aberration, field sags, distortion aberration and lateral chromatic aberration of Numerical Embodiment 2 of the present microscope optical system at the wide-angle end.
Figure 5B:
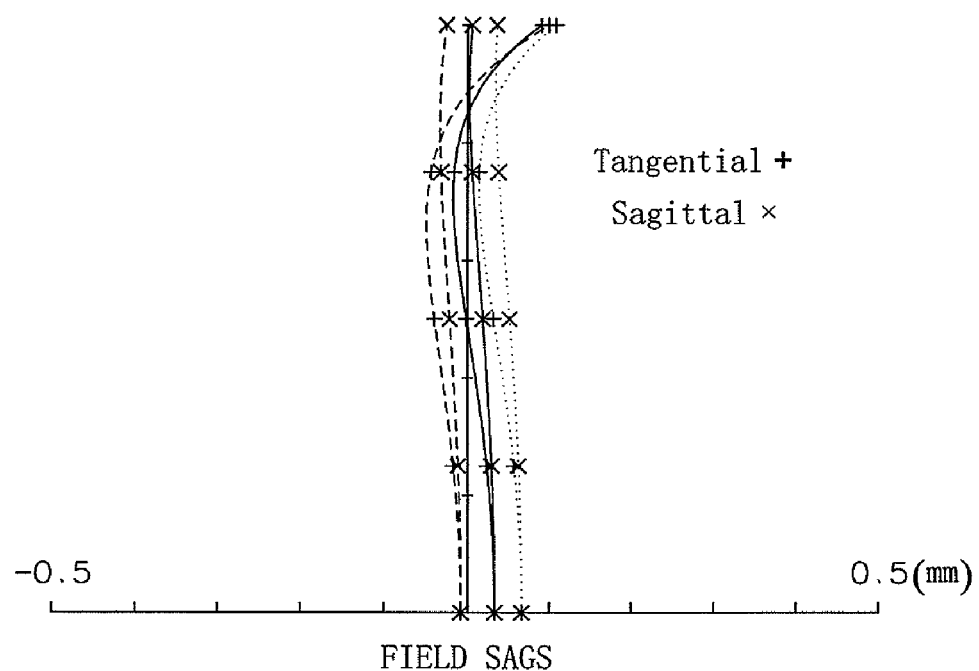
Figure 5C:
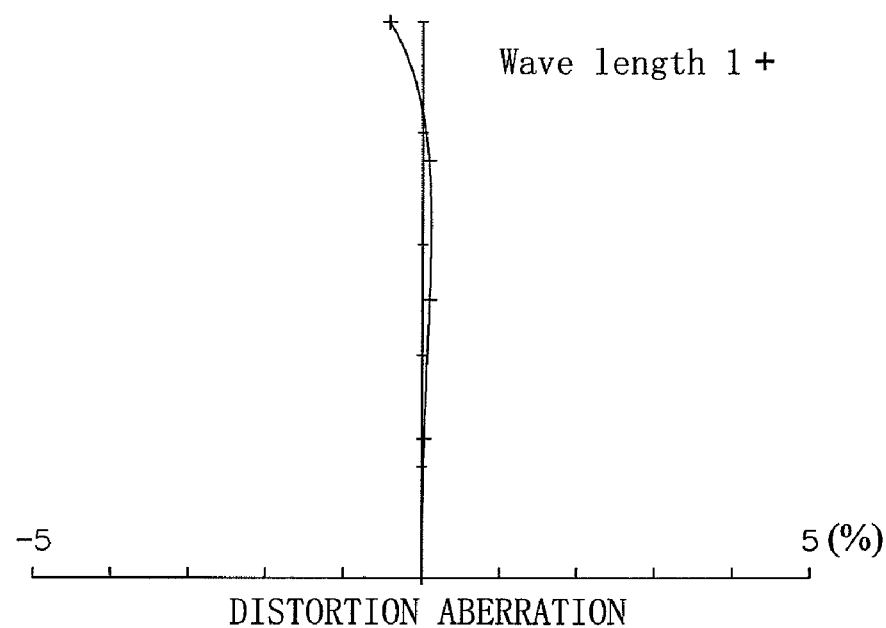
Figure 5D:
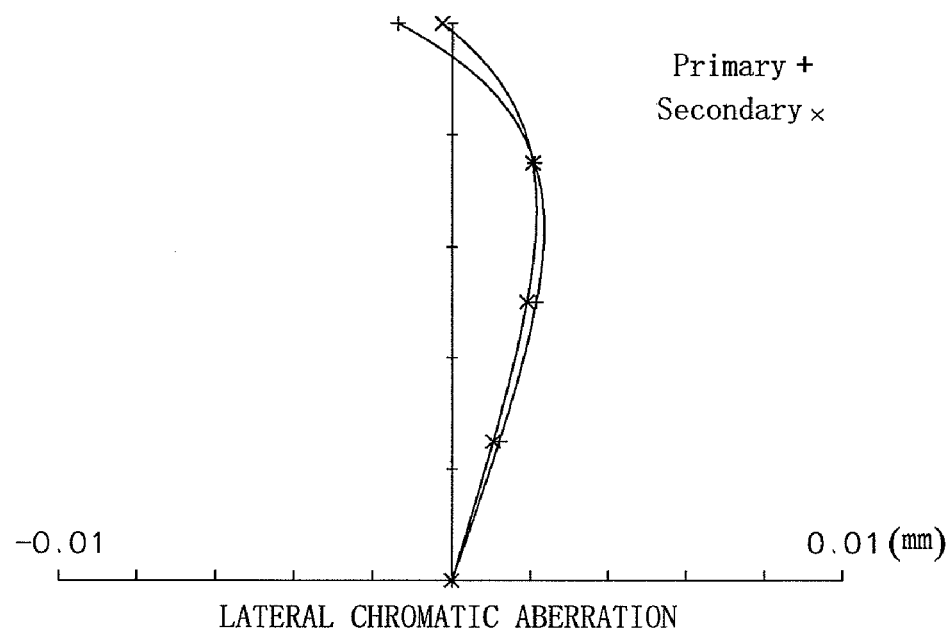
Figure 6A:
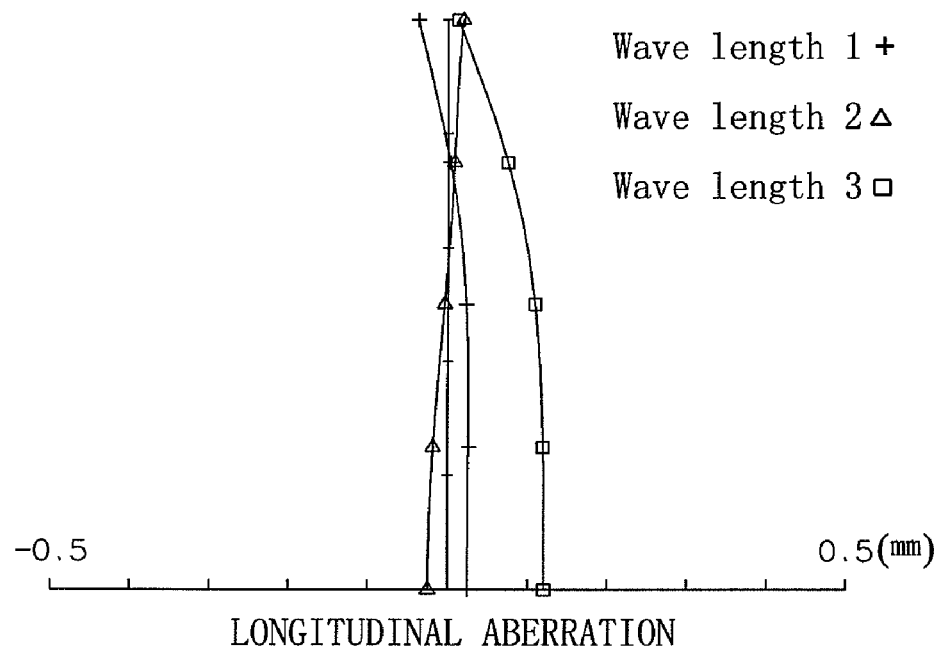
FIGS. 6A-6D respectively show longitudinal spherical aberration, field sags, distortion aberration and lateral chromatic aberration of Numerical Embodiment 2 of the present microscope optical system at the intermediate zoom position.
Figure 6B:
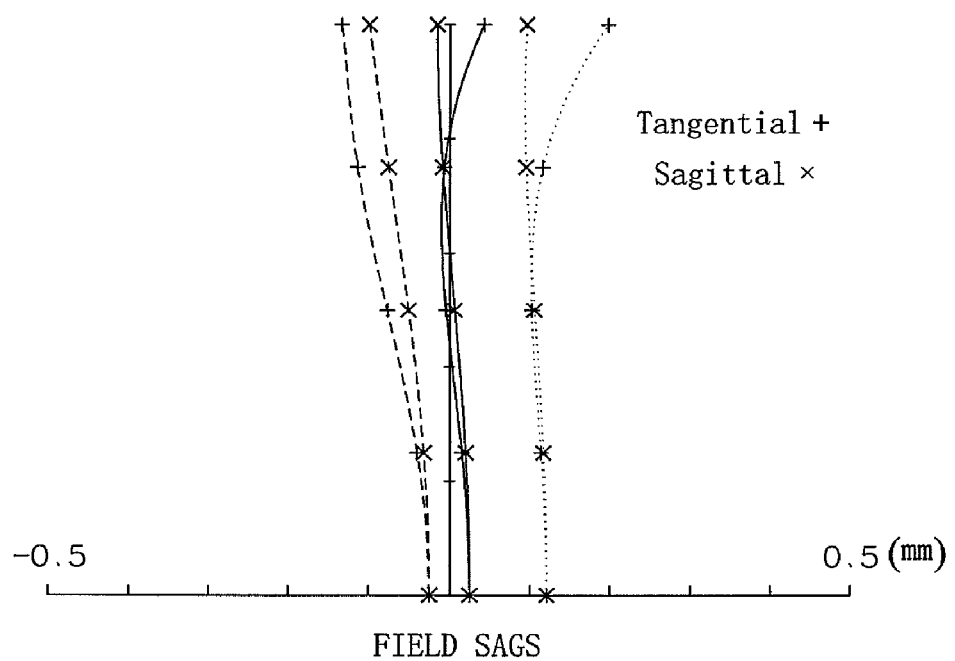
Figure 6C:
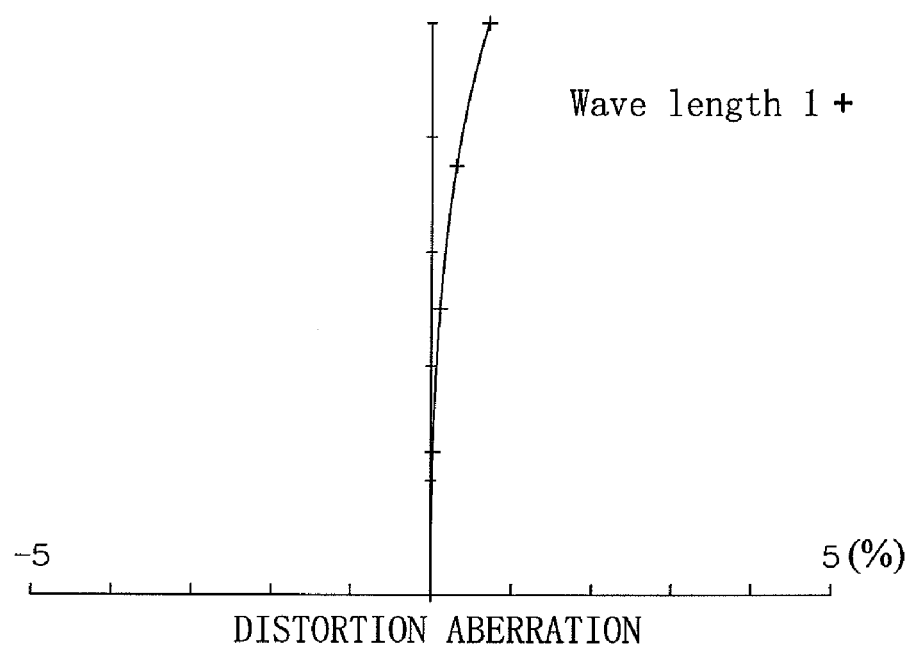
Figure 6D:
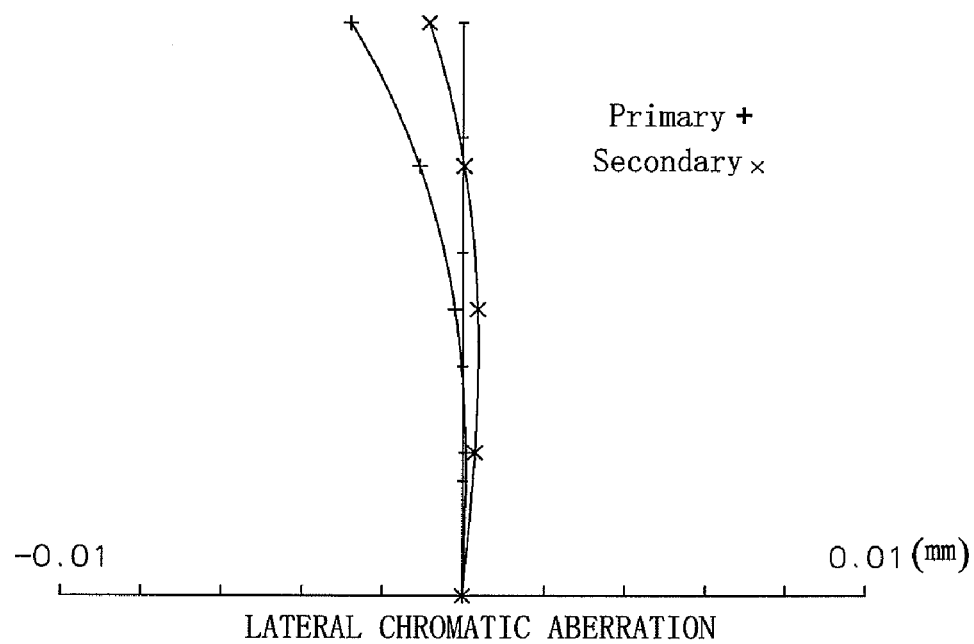
Figure 7A:
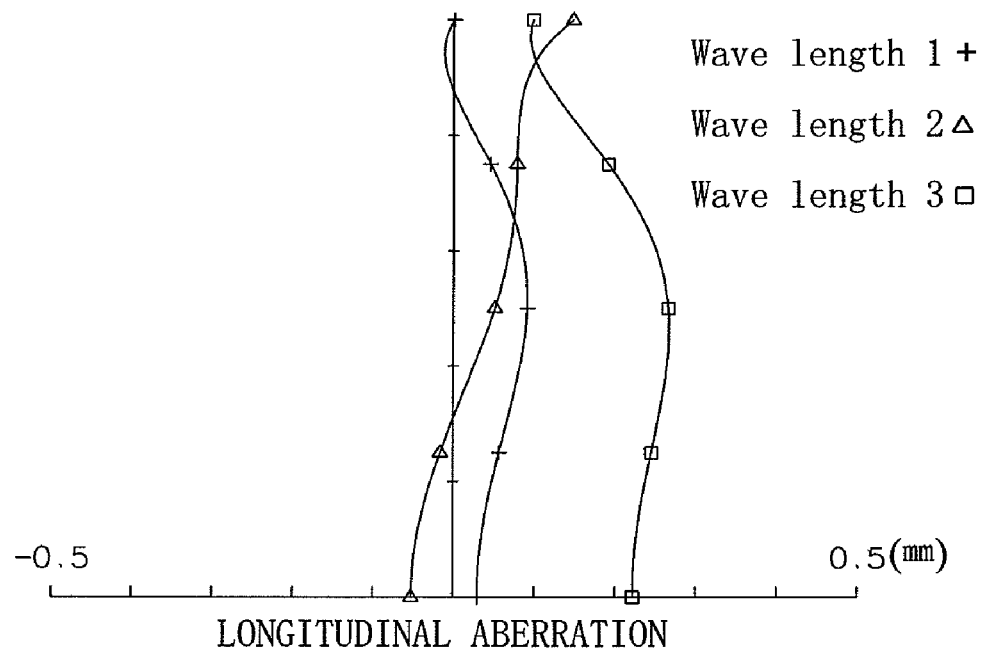
FIGS. 7A-7D respectively show longitudinal spherical aberration, field sags, distortion aberration and lateral chromatic aberration of Numerical Embodiment 2 of the present microscope optical system at the telephoto end.
Figure 7B:
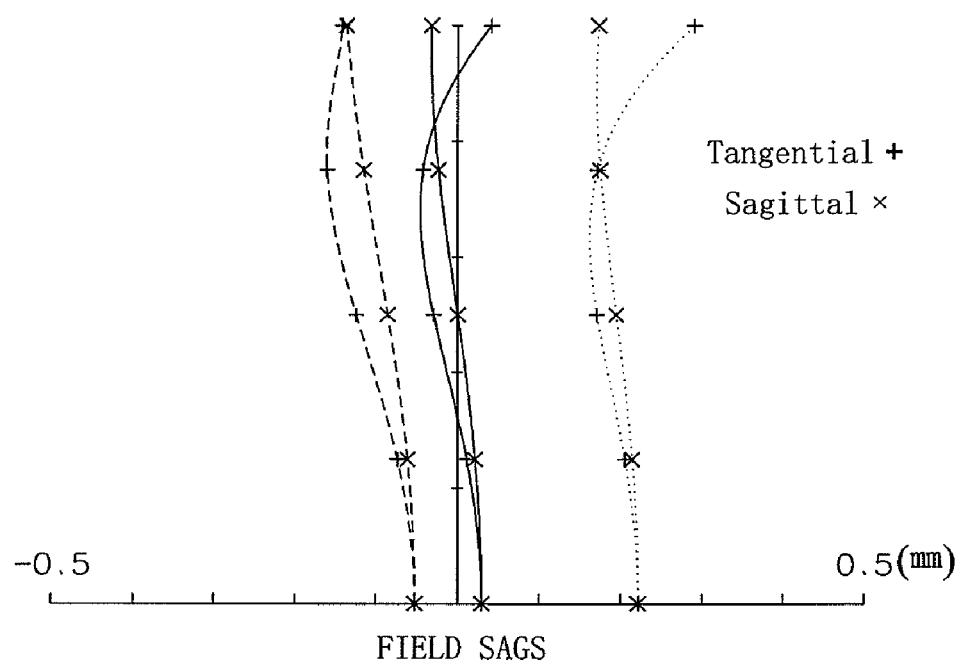
Figure 7C:
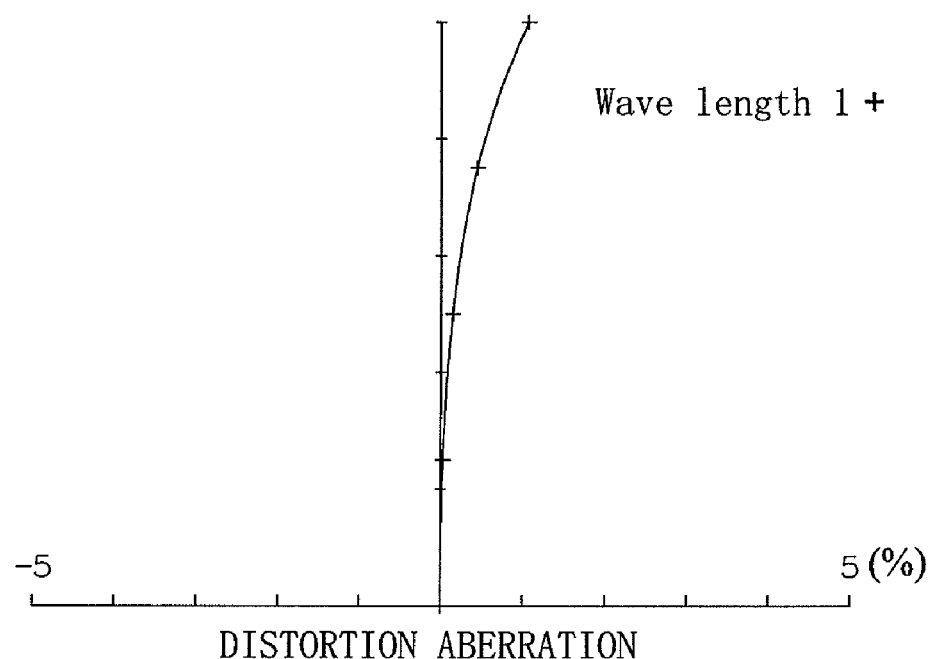
Figure 7D:
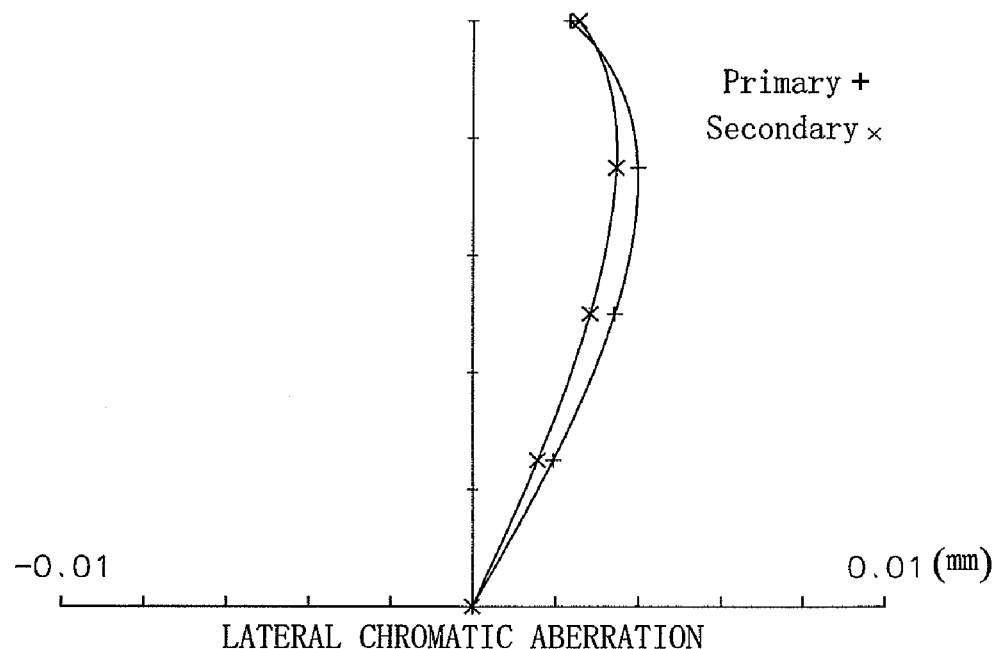

With reference to the drawings and in particular to FIGS. 1A-1C, which show a lens arrangement of a microscope optical system 1 in accordance with the present invention, respectively at a wide-angle end, an intermediate zoom position, and a telephoto end. The microscope optical system 1 in accordance with the present invention is suitable for use in a digital microscope and is capable of zooming between 0.5 to 4.8 times of magnification. The microscope optical system 1 comprises, from an object side to an image side, a first lens group G1, a second lens group G2, a stop STO, a third lens group G3, a fourth lens group G4 and a sensor 10.

The first lens group G1 consists of four lens elements L1, L2, L3 and L4 and is used to eliminate chromatic aberration because the change of chromatic aberration is very large during zooming of the microscope optical system 1 from the wide-angle end to the telephoto end.

The second lens group G2 is used to zoom in and out and is considered a "zooming" lens group. The second lens group G2 comprises a cemented doublet element consisting of two lens elements L5 and L6, which are cemented together. Thus, the lens elements L5 and L6 have opposing surfaces that are identical and cemented together and consequently, each of the lens elements L5 and L6 has only one exposed surface, which, for the lens element L6, is the surface that is adjacent to the image side, which is hereinafter referred to as "image-side surface".

In accordance with the present invention, a resin layer is coated on the exposed image-side surface of the lens element L6 and forms an aspheric surface that faces the image side for correcting spherical aberration during zooming. It is noted that due to the small thickness, the resin layer is only visible as a bolded line in the drawings and is not labeled to avoid unnecessary confusion.

The stop STO is fixed to the image-side surface of the lens element L6 and is axially movable in unison with the second lens group G2.

The third lens group G3 comprises a cemented doublet element consisting of two lens elements L7 and L8 that are cemented together and a separate convex lens element L9. The third lens group G3 corrects any change of the image position of the microscope, caused by zooming of the second lens group G2. In this respect, the third lens group G3 is considered a "compensation" lens group.

The fourth lens group G4 has a cemented doublet element consisting of two lens elements L10 and L11 cemented together and a separate concave lens element L12.

The sensor 10 is arranged behind the fourth lens group G4 (in the direction from the object side to the image side) to receive an image of an object and converts the optic signal representing the image of the object into electrical signal or other desired forms of signal. In a preferred embodiment of the present invention, the sensor 10 comprises a charge-coupled device (CCD). However, it is apparent that other transducers or signal converting devices, such as CMOS device, can also be used without departing the scope of the present invention.

If desired, the optical system 1 may further comprise two cover glasses 11 and 12. The cover glass 11 is located at the object side of the first lens group G1 and closest to an object to be observed by the microscope optic system 1, and the cover glass 12 is located between the fourth lens group G4 and the sensor 10. The cover glasses 11 and 12 may be coated with any desired optic films and may provide any desired functions, such as filtering of unwanted lights and anti-reflection.

In accordance with the present invention, the first and fourth lens groups G1 and G4 are kept stationary and the second and third lens groups G2 and G3 are movable during zooming of the optical system 1 from the wide-angle end to the telephoto end. Thus, the microscope optical system 1 can zoom and focus by moving the second and third lens groups G2 and G3.

In order to obtain the best microscope image having a high resolution and a high zoom ratio, the microscope optical system 1 satisfies the following conditions:

$$0.5 < \frac{F1}{F2} < 1.0 \quad (1)$$

$$\left|\frac{F2}{F3}\right| < 0.1 \quad (2)$$

where F1 represents the combined focus (or overall focus) of the first lens group G1, F2 represents the combined focus of the second lens group G2, and F3 represents the combined focus of the third lens group G3.

If the ratio of F1 to F2 (namely F1/F2) exceeds the upper limit (namely, 1.0) set in condition (1), the power of the second lens group G2 get too strong so that the lens thickness on the circumferential edge of the lens element L5 becomes too thin to machine. Also, the sensitivity of the total microscope optical system 1 is increased, and the microscope optical system 1 is difficult to be adjusted properly. If the ratio of F1 to F2 exceeds the lower limit of condition (1), namely 0.5, then lateral chromatic aberration of the microscope optical system 1 at the telephoto end is difficult to correct.

If the upper limit of condition (2) is exceeded, the focus power of the third lens group G3 gets weak so that the total length of the microscope optical system 1 becomes too long and the system is bulky and not compact. In other words, violation of condition (2) makes the optic system 1 impossible to realize a high zoom ratio in a short distance.

In accordance with the present invention, at least one of the lens elements of the microscope optical system 1 comprises one aspheric surface. In the embodiment illustrated, the resin layer coated on the image-side surface of the lens element L6 forms the aspheric surface, which functions to correct spherical aberration during continuous zooming operation of the microscope optical system 1. Particularly, the function of the aspheric surface of the resin layer is more notable when the zoom ratio of the microscope optical system 1 reaches over five.

The microscope optical system 1 contains twelve lens elements L1 to L12, at least one of which, such as the lens element L6, has one aspheric surface. The microscope optical system 1 has a high zoom ratio of about ten so that a user can randomly choose any desired zoom ratio without making any change or switching of objective lens. Moreover, the microscope optical system 1 is coupled to a CCD sensor 10, an observer or user may directly view digital microscope images displayed on a large display screen and stores the images for subsequent edition or inspection.

A digital microscope that adopts the microscope optical system 1 of the present invention may present the characteristics of high resolution and high zoom ratio and can also improve stability, observability and storability of the digital microscope images due to the incorporation of the sensor 10.

The digital microscope that incorporates the optic system of the present invention employs at least one aspheric surface. As mentioned, the aspheric surface can be formed by the resin layer coated on the image-side surface of the lens element L6; and the image-side surface of the resin layer is made aspheric. The aspheric surface can be expressed by the following formula:

$$DD = \frac{CH^2}{1+\sqrt{1-(1+K)C^2H^2}} + E_4H^4 + E_6H^6 + E_8H^8 + E_{10}H^{10} + E_{12}H^{12} + E_{14}H^{14}$$

where DD represents displacement in the direction of the optical axis at the position of height H from the optical axis relative to the surface vertex, K represents a cone constant, C is equal to 1/R and R is the curvature radius of the aspheric lens surface on the optical axis, H represents a height of a point on the aspheric surface with respect to the optical axis, and $E_4$, $E_6$, $E_8$, $E_{10}$, $E_{12}$ and $E_{14}$ are aspheric coefficients for fourth, sixth, eighth, tenth, twelfth and fourteenth order terms.

The present invention will be more fully understood by describing two numerical embodiments, which will be respectively referred to as Numerical Embodiments 1 and 2. The numerical data of Numerical Embodiments 1 and 2 will be shown below. In each of the numerical embodiments, "i" represents the order of each lens element surface, including the stop STO and the cover glass 12 (but cover glass 11 being excluded), counted successively from the object side to the image side, "Ri" represents the radius of curvature (mm) of the ith surface, "D" represents the thickness of each lens element or the distance (mm) between the ith surface and the (i+1)th surface, "Nd" and "Vd" respectively represent the refractive index (d-line) and Abbe number (d-line) of each lens element, D1 represents a first variable distance between the first lens group G1 and the second lens group G2, D2 represents a second variable distance between the second lens group G2 and the third lens group G3, and D3 represents a third variable distance between the third lens group G3 and the fourth lens group G4.

Numerical Embodiment 1

| Surface (i) | Ri (mm) | D (mm) | Nd | Vd | Lens | Group |
|---|---|---|---|---|---|---|
| 1 | −34.044700 | 4.1363 | 1.84666 | 23.78 | L1 | G1 |
| 2 | −23.316300 | 0.100000 | | | | |
| 3 | 37.422500 | 4.711400 | 1.8466 | 23.78 | L2 | |
| 4 | −75.849400 | 0.836100 | | | | |
| 5 | 16.960160 | 7.390900 | 1.638535 | 55.38 | L3 | |
| 6 | −39.620220 | 2.720500 | 1.805255 | 25.43 | L4 | |
| 7 | 12.698600 | D1 | | | | |
| 8 | 30.752000 | 4.700000 | 1.618014 | 63.33 | L5 | G2 |
| 9 | −7.600000 | 0.900000 | 1.801050 | 34.97 | L6 | |
| 10 | −16.211000 | 0.080000 | 1.52 | 52 | Resin | |
| 11 | −15.628300 | 0 | | | Layer | |

-continued

Numerical Embodiment 1

| Surface (i) | Ri (mm) | D (mm) | Nd | Vd | Lens | Group |
|---|---|---|---|---|---|---|
| STO | ∞ | D2 | | | | |
| 13 | −18.688800 | 4.800000 | 1.605644 | 43.71 | L7 | G3 |
| 14 | 8.342700 | 2.386400 | 1.84666 | 23.78 | L8 | |
| 15 | 10.285200 | 7.440600 | | | | |
| 16 | 52.873800 | 4.352900 | 1.4970 | 81.55 | L9 | |
| 17 | −13.269200 | D3 | | | | |
| 18 | 18.189600 | 7.132800 | 1.8340 | 37.16 | L10 | G4 |
| 19 | −12.649300 | 3.556800 | 1.805255 | 25.43 | L11 | |
| 20 | −53.309400 | 2.422400 | | | | |
| 21 | −14.772700 | 1.000000 | 1.4970 | 81.55 | L12 | |
| 22 | 11.835300 | 2.000000 | | | | |
| 23 | ∞ | 0.400000 | | | Cover Glass 12 | |
| 24 | ∞ | 4.516880 | | | | |

In the above given Numerical Embodiment 1, lens L6 of the second lens group G2 comprises a resin layer that forms the aspheric surface (Surface No. 11 in the above table), of which the cone constant and the aspheric coefficients are K=0.0 and $E_4=-5.9705\times10^{-6}$, $E_6=-3.4433\times10^{-7}$, $E_8=-1.0028\times10^{-8}$, and $E_{10}=1.7980\times10^{-10}$. The remaining aspheric coefficients are zeros.

In the above given Numerical Embodiment 1, values of the variable distances D1, D2 and D3 are listed in the following table:

| | D1 (mm) | D2 (mm) | D3 (mm) |
|---|---|---|---|
| Wide angel end (f = −8.98 mm) | 57.813986 | 5.866082 | 12.465461 |
| Intermediate position zoom (f = −36.697 mm) | 18.831254 | 10.054349 | 52.215155 |
| Telephoto end (f = −9.474127 mm) | 3.0 | 72.682576 | 5.394307 |

Longitudinal aberration, field sags, distortion aberration and lateral chromatic aberration of the present microscope optical system 1 according to Numerical Embodiment 1 at the telephoto end, the intermediate zoom position and the wide-angle end are respectively shown in FIGS. 2A-2D, FIGS. 3A-3D and FIGS. 4A-4D. Thus, it can be seen that the microscope optical system 1 of Numerical Embodiment 1 shows excellent optical performance.

In the following table, numeral data of the second numerical embodiment (Numerical Embodiment 2) will be given and it is noted that the variable or symbols used in the following table in the same as those of Numerical Embodiment 1.

Numerical Embodiment 2

| Surface (i) | Ri (mm) | D (mm) | Nd | Vd | Lens | Group |
|---|---|---|---|---|---|---|
| 1 | −56.700000 | 5.200000 | 1.84666 | 23.78 | L1 | G1 |
| 2 | −23.710000 | 0.100000 | | | | |
| 3 | 38.475200 | 5.420000 | 1.8466 | 23.78 | L2 | |
| 4 | −78.100000 | 0.100000 | | | | |
| 5 | 17.000000 | 7.000000 | 1.638535 | 55.38 | L3 | |
| 6 | −50.400000 | 2.600000 | 1.805255 | 25.43 | L4 | |
| 7 | 12.729600 | D1 | | | | |
| 8 | 26.707000 | 6.500000 | 1.618014 | 63.33 | L5 | G2 |
| 9 | −7.124800 | 0.900000 | 1.801050 | 34.97 | L6 | |
| 10 | −14.900000 | 0.070000 | 1.52 | 52 | Resin | |
| 11 | −14.771600 | −0.050000 | | | Layer | |

-continued

Numerical Embodiment 2

| Surface (i) | Ri (mm) | D (mm) | Nd | Vd | Lens | Group |
|---|---|---|---|---|---|---|
| STO | ∞ | D2 | | | | |
| 13 | −18.700000 | 3.210000 | 1.605644 | 43.71 | L7 | G3 |
| 14 | 8.347300 | 2.200000 | 1.84666 | 23.78 | L8 | |
| 15 | 9.619600 | 7.200000 | | | | |
| 16 | 56.840000 | 3.600000 | 1.4970 | 81.55 | L9 | |
| 17 | −11.934700 | D3 | | | | |
| 18 | 19.177400 | 7.465800 | 1.8340 | 37.16 | L10 | G4 |
| 19 | −14.500000 | 3.500000 | 1.805255 | 25.43 | L11 | |
| 20 | −39.000000 | 2.275500 | | | | |
| 21 | −14.000000 | 1.266700 | 1.4970 | 81.55 | L12 | |
| 22 | 11.448400 | 2.000000 | | | | |
| 23 | ∞ | 0.400000 | | | | Cover Glass 12 |
| 24 | ∞ | 4.168800 | | | | |

Again, there is also a resin layer combined with the lens element L6 of the second lens group G2 in Numerical Embodiment 2 and the resin layer forms an aspheric surface (Surface No. 11 in the above table), of which the cone constant and the aspheric coefficients are K=0.0 and $E_4$=−2.4517×10$^{-7}$, $E_6$=−6.8743×10$^{-7}$, and $E_8$=6.9477×10$^{-12}$. The remaining aspheric coefficients are zeros.

In the above given Numerical Embodiment 2, values of the variable distances D1, D2 and D3 are listed in the following table:

| | D1 (mm) | D2 (mm) | D3 (mm) |
|---|---|---|---|
| Wide angel end (f = −7.610 mm) | 57.81399 | 3.488397 | 13.8244 |
| Intermediate position zoom (f = −24.2337 mm) | 6.89932 | 31.66446 | 36.20578 |
| Telephoto end (f = −10.7449 mm) | 3.0 | 65.84994 | 5.93816 |

Longitudinal aberration, field sags, distortion aberration and lateral chromatic aberration of the present microscope optical system 1 according to Numerical Embodiment 2 at the telephoto end, the intermediate zoom position and the wide-angle end are respectively shown in FIGS. 5A-5D, FIGS. 6A-6D and FIGS. 7A-7D. Thus, it can be seen that the microscope optical system 1 of Numerical Embodiment 2 exhibits excellent optical performance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A microscope optical system comprising, in order from an object side to an image side, a first lens group, a second lens group, a stop, a third lens group, a fourth lens group and a sensor, each lens groups comprising at least one lens element, at least one of said lens elements of the lens groups having one aspheric surface, wherein when the microscope is zoomed from a wide-angle end to a telephoto end, the first and fourth lens groups are kept stationary, while the second and third lens groups are movable, and wherein the following condition is satisfied:

$$0.5 < \frac{F1}{F2} < 1.0$$

where F1 is combined focus of the first lens group and F2 is combined focus of the second lens group.

2. The microscope optical system as claimed in claim 1 further satisfying the following condition:

$$\left|\frac{F2}{F3}\right| < 0.1$$

where F2 is the combined focus of the second lens group and F3 is combined focus of the third lens group.

3. The microscope optical system as claimed in claim 2, wherein each lens group comprises a plurality of lens elements.

4. The microscope optical system as claimed in claim 2, wherein the at least one lens element of the second lens group has an image-side surface and wherein the second lens group comprises a resin layer coated on the image-side surface of the at least one lens element of the second lens group, the resin layer forming the aspheric surface.

5. The microscope optical system as claimed in claim 2, wherein the first lens group comprises four lens elements.

6. The microscope optical system as claimed in claim 2, wherein the second lens group comprises a cemented doublet element consisting of two lens elements cemented together.

7. The microscope optical system as claimed in claim 2, wherein the third lens group comprises a cemented doublet element consisting of two lens elements cemented together and a separate convex lens element.

8. The microscope optical system as claimed in claim 2, wherein the fourth lens group comprises a cemented doublet element consisting of two lens elements cemented together and a separate concave lens element.

9. The microscope optical system as claimed in claim 1, wherein the stop is fixed to and movable in unison with the second lens group.

10. The microscope optical system as claimed in claim 1, wherein the sensor comprises a charge-coupled device.

11. The microscope optical system as claimed in claim 1 further comprising a first cover glass located at the object side of the first lens group and a second cover glass located between the fourth lens group and the sensor.

12. A digital microscope comprising an optical system, which comprises a first lens group, a second lens group, a stop, a third lens group, a fourth lens group and a sensor in order from an object side to an image side, each lens groups comprising at least one lens element, at least one of said lens elements of the lens groups having an aspheric surface; wherein when the optic systems is zoomed from a wide-angle end to a telephoto end, the first and fourth lens groups are kept stationary and the second and third lens groups are movable, and the following condition is satisfied:

$$0.5 < \frac{F1}{F2} < 1.0$$

where F1 is combined focus of the first lens group and F2 is combined focus of the second lens group.

13. The digital microscope as claimed in claim 12, wherein the optic system further satisfies the following condition:

$$\left|\frac{F2}{F3}\right|<0.1$$

where F2 is the combined focus of the second lens group and F3 is combined focus of the third lens group.

14. The digital microscope as claimed in claim 13, wherein the stop is fixed to and movable in unison with the second lens group.

15. The digital microscope as claimed in claim 13, wherein the sensor comprises a charge-coupled device.

16. The digital microscope as claimed in claim 13, wherein the at least one lens element of the second lens group has an image-side surface and wherein the second lens group comprises a resin layer coated on the image-side surface of the at least one lens element of the second lens group, the resin layer forming the aspheric surface.

17. The digital microscope as claimed in claim 13, wherein the first lens group comprises four lens elements.

18. The digital microscope as claimed in claim 13, wherein the second lens group comprises a cemented doublet element consisting of two lens elements cemented together.

19. The digital microscope as claimed in claim 13, wherein the third lens group has a cemented doublet element consisting of two lens elements cemented together and a separate convex lens element.

20. The digital microscope as claimed in claim 13, wherein the fourth lens group has a cemented doublet element consisting of two lens elements cemented together and a separate concave lens element.

* * * * *